US006553463B1

(12) United States Patent
Arimilli et al.

(10) Patent No.: US 6,553,463 B1
(45) Date of Patent: Apr. 22, 2003

(54) METHOD AND SYSTEM FOR HIGH SPEED ACCESS TO A BANKED CACHE MEMORY

(75) Inventors: Lakshminarayana Baba Arimilli, Austin, TX (US); Ravi Kumar Arimilli, Austin, TX (US); James Stephen Fields, Jr., Austin, TX (US); Sanjeev Ghai, Austin, TX (US); Praveen S. Reddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,959

(22) Filed: Nov. 9, 1999

(51) Int. Cl.[7] .............................................. G06F 12/00
(52) U.S. Cl. ........................ 711/146; 711/5; 711/105; 711/137; 711/124; 711/167
(58) Field of Search ............................ 711/118, 5, 105, 711/119, 153, 137, 173, 127, 157, 124, 146, 167; 710/13, 109, 36, 38

(56) References Cited

U.S. PATENT DOCUMENTS

| 4,503,491 A | * | 3/1985 | Lushtak et al. ................. 711/5 |
| 5,323,489 A | * | 6/1994 | Bird ............................. 711/167 |
| 5,745,913 A | * | 4/1998 | Pattin et al. ................. 711/105 |
| 5,761,694 A | * | 6/1998 | Rao ............................... 711/5 |
| 5,895,487 A | * | 4/1999 | Boyd et al. .................. 711/122 |
| 6,115,768 A | * | 9/2000 | Yamamoto ................... 710/107 |
| 6,185,654 B1 | * | 2/2001 | Van Doren ..................... 711/5 |

* cited by examiner

Primary Examiner—Matthew Kim
Assistant Examiner—Matthew D. Anderson
(74) Attorney, Agent, or Firm—Casimer K. Salys; Bracewell & Patterson, L.L.P.

(57) ABSTRACT

A method and system for high speed data access of a banked cache memory. In accordance with the method and system of the present invention, during a first cycle, in response to receipt of a request address at an access controller, the request address is speculatively transmitted to a banked cache memory, where the speculative transmission has at least one cycle of latency. Concurrently, the request address is snooped in a directory associated with the banked cache memory. Thereafter, during a second cycle the speculatively transmitted request address is distributed to each of multiple banks of memory within the banked cache memory. In addition, the banked cache memory is provided with a bank indication indicating which bank of memory among the multiple banks of memory contains the request address, in response to a bank hit from snooping the directory. Thereafter, data associated with the request address is output from the banked cache memory, in response to the bank indication, such that access time to a high latency remote banked cache memory is minimized.

21 Claims, 3 Drawing Sheets

METHOD AND SYSTEM FOR HIGH SPEED ACCESS TO A BANKED CACHE MEMORY

BACKGROUND OF THE INVENTION

1. Technical Field

The present invention relates in general to an improved method and system for accessing cache memory within a data processing system, and in particular, to an improved method and system for high speed access to a banked cache memory. Still more particularly, the present invention relates to an improved method and system for high speed access to a high latency remote banked cache memory wherein the access time to the cache memory is minimized.

2. Description of the Related Art

A digital computer system utilizes a central processing unit and a computer main memory to perform a wide range of functions. Such circuitry permits repetitive functions to be carried out at rates much higher than if the corresponding functions could be performed manually. Memory locations provide storage from which data can be read or to which data can be written.

As technology develops, multiple processors and multiple levels of memory and cache have been added to digital computer systems. In addition, the utilization of on-chip and off-chip cache continues to increase processing capabilities. In general, requests come from a system bus to a processor system that includes a processor core and multiple levels of on-chip and off-chip cache. The processor system then performs a snoop to detect whether the requested data is available in the on-chip cache. In addition, the processor system typically snoops an off-chip cache associated therewith. From the snoop return, the request may be directed to a particular cache in order to access the requested data.

Several types of memory have been developed which may be utilized as on-chip cache, off-chip cache and/or main memory. These random access memories (RAM) are preferably semi-conductor based memory that can be read from and written to by the central processing unit and other hardware devices. The storage locations within RAM can be accessed in any order. For example, one type of RAM which is well known in the art is a dynamic RAM (DRAM). Dynamic RAM is typically utilized for storing large increments of data. In particular, DRAMs store information in integrated circuits containing capacitors. Because capacitors lose their charge over time, DRAM circuits typically include logic to refresh the DRAM chips continuously. While a DRAM chip is being refreshed, the chip cannot be read by the processor, which leads to wait states while the DRAM chips is being refreshed. Another type of RAM which is well known in the art is static RAM (SRAM). SRAMs store information in logic circuits known as flip-flops, which retain information as long as there is enough power to run the device. SRAMs do not have the delay states inherent in DRAMs, however SRAM circuitry is more complex than DRAM circuitry and is typically utilized in smaller increments.

In general, memory devices such as SRAM and DRAM are formed in memory locations which form memory arrays. The memory locations of the memory arrays are identified by memory addresses. When memory locations of a memory array are to be accessed, the addresses of the memory locations are provided to decoder circuitry of the memory device, as is well known in the art. The decoder circuitry decodes the address signals applied thereto to permit access to the memory locations identified by the address signals. Typically, multiple banks of SRAM or DRAM may be placed together whereby a controller controls access to each bank of memory and routes addresses to the proper bank of memory within the banked cache memory.

In a recent configuration of processor/memory devices, a processor accesses an on-chip level-one (L1) cache which comprises small, fast SRAM, an on-chip level-two (L2) cache which comprises banked SRAM and an off-chip level-three (L3) cache which comprises banked DRAM cache. In addition, the processor may access a main memory which is shared among multiple devices. There is a greater latency inherent in accessing data from off-chip memories than from on-chip memories. However, off-chip memories are typically larger than on-chip memories and thus can provide large amounts of data for a single access. Among the off-chip memories, a processor can access an L3 cache much more quickly than a main memory, particularly when the main memory is shared by multiple processors.

Several methods have been developed to reduce the latency inherent in accessing a remote L3 cache and in accessing banked DRAM cache to determine which bank of memory to access next. According to one method known as bank parking, for each request from a system bus, a speculative access to the bank of memory that was previously accessed is made. By this method, speculative access is only beneficial if the bank of memory that was previously accessed is requested again. According to another method known as redundant access, each bank of memory is a clone of all other banks of memory. Therefore, for each request, the same address is passed to each bank of memory whereby any available banks of memory can respond to the request. In order for redundant access to be beneficial, a small number of banks of memory and small amount of cache in each bank of memory are utilized. However, it is preferable to utilize a large number of banks and a large amount of cache in each bank for an L3 cache.

In view of the foregoing, it is therefore desirable to provide a method of accessing a high latency banked cache memory and in particular accessing off-chip banked DRAM cache from a processor, whereby fast access to the cache is provided.

SUMMARY OF THE INVENTION

In view of the foregoing, it is therefore an object of the present invention to provide an improved method and system for accessing cache memory within a data processing system.

It is another object of the present invention to provide an improved method and system for high speed access to a banked cache memory.

It is yet another object of the present invention to provide an improved method and system for high speed access to a high latency remote banked cache memory wherein the access time to the cache is minimized.

In accordance with the method and system of the present invention, during a first cycle, in response to receipt of a request address at an access controller, the request address is speculatively transmitted to a banked cache memory, where the speculative transmission has at least one cycle of latency. Concurrently, the request address is snooped in a directory associated with the banked cache memory. Thereafter, during a second cycle the speculatively transmitted request address is distributed to each of multiple banks of memory within the banked cache memory. In addition, the banked cache memory is provided with a bank indication indicating which bank of memory among the multiple banks of memory contains the request address, in response to a bank hit from snooping the directory. Thereafter, data associated with the request address is output from the banked cache memory, in response to the bank indication, such that access time to a high latency remote banked cache memory is minimized.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

Figure 1:
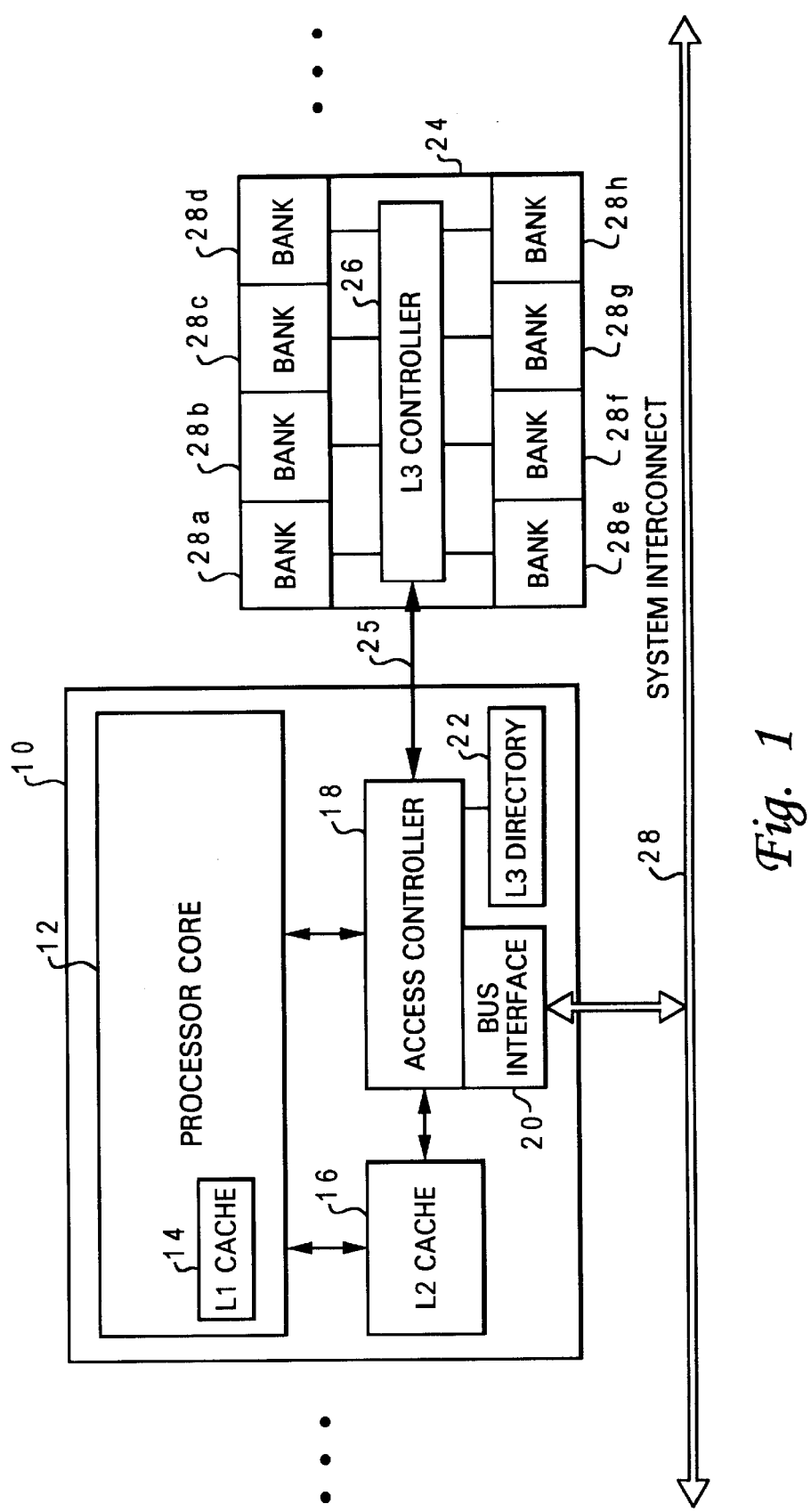
FIG. 1 depicts a high-level block diagram of a generic data processing system having multiple levels of accessible cache.

With reference now to the figures and in particular with reference now to FIG. 1, there is depicted a high-level block diagram of a generic data processing system having multiple levels of accessible cache. A data processing system 10 is illustrated including a processor core 12 with access to data stored in a level-one (L1) cache 14 within processor core 12 and a level-two (L2) cache 16. L1 cache is preferably a small memory cache built into processor core 12 which provides for low latency memory access. L2 cache is preferably a memory cache which is larger than L1 cache and may consist of static random access memory (SRAM).

An access controller 18 directs address requests and data within said data processing system 10. A bus interface 20 interfaces with a system interconnect 28 to control the flow of data and addresses between access controller 18 and system interconnect 28. System interconnect 28 provides multiple buses for transporting data and addresses between components within a data processing system. While not depicted, multiple processors with associated levels of cache may be connected along system interconnect 28 within data processing system 10.

Access controller 18 also directs address requests and data to an L3 controller 26 within level-three (L3) banked cache 24 by an L3 interconnect 25. L3 controller 26 controls access to each of banks of memory 28a–28h. L3 interconnect 25 preferably includes multiple buses by which addresses and data may be transmitted between access controller 18 and L3 controller 26. In particular, the present invention depicts a banked dynamic random access memory (DRAM) cache as banked cache 24, however in alternate embodiments, other forms of banked cache may be utilized. Banked cache 24 includes multiple banks 28a–28h, wherein the total cache memory provided by banked cache 24 is substantially larger than that provided by L2 cache 16. For example, L2 cache 16 may comprise 2 MB of SRAM while banked cache 24 comprises 16 MB of DRAM. However, access to L2 cache 16 is typically lower in latency than access to banked cache 24 since L2 cache 16 typically resides on-chip.

A snoop path from access controller 18 to each of the caches is provided whereby for an address request received at access controller 18, a snoop of each of the caches is performed to determine if the address request will hit in any of the caches. In particular, in snooping the cache, access controller 18 snoops an L3 directory 22 and concurrently speculatively transmits the address request to banked cache 24. Once the address request is received at L3 controller 26, the address request is passed to each of banks 28a–28h. If a bank hit is returned from snooping L3 directory 22, access controller 18 transmits a bank indicator to L3 controller 26 indicating which bank contains said address request, whereby the address request may be accessed.

If there is not a hit in the cache returned from the snoop, access controller 18 may send the address request to a main memory (not shown), wherein the address request is received by a main memory controller (not shown). Typically, accesses to a main memory are slow because the main memory is shared by multiple devices. However, by utilizing an L3 cache, such as L3 banked cache 24, large amounts of data can be accessed for each cycle, thus encouraging a large L3 banked cache memory.

Figure 2:
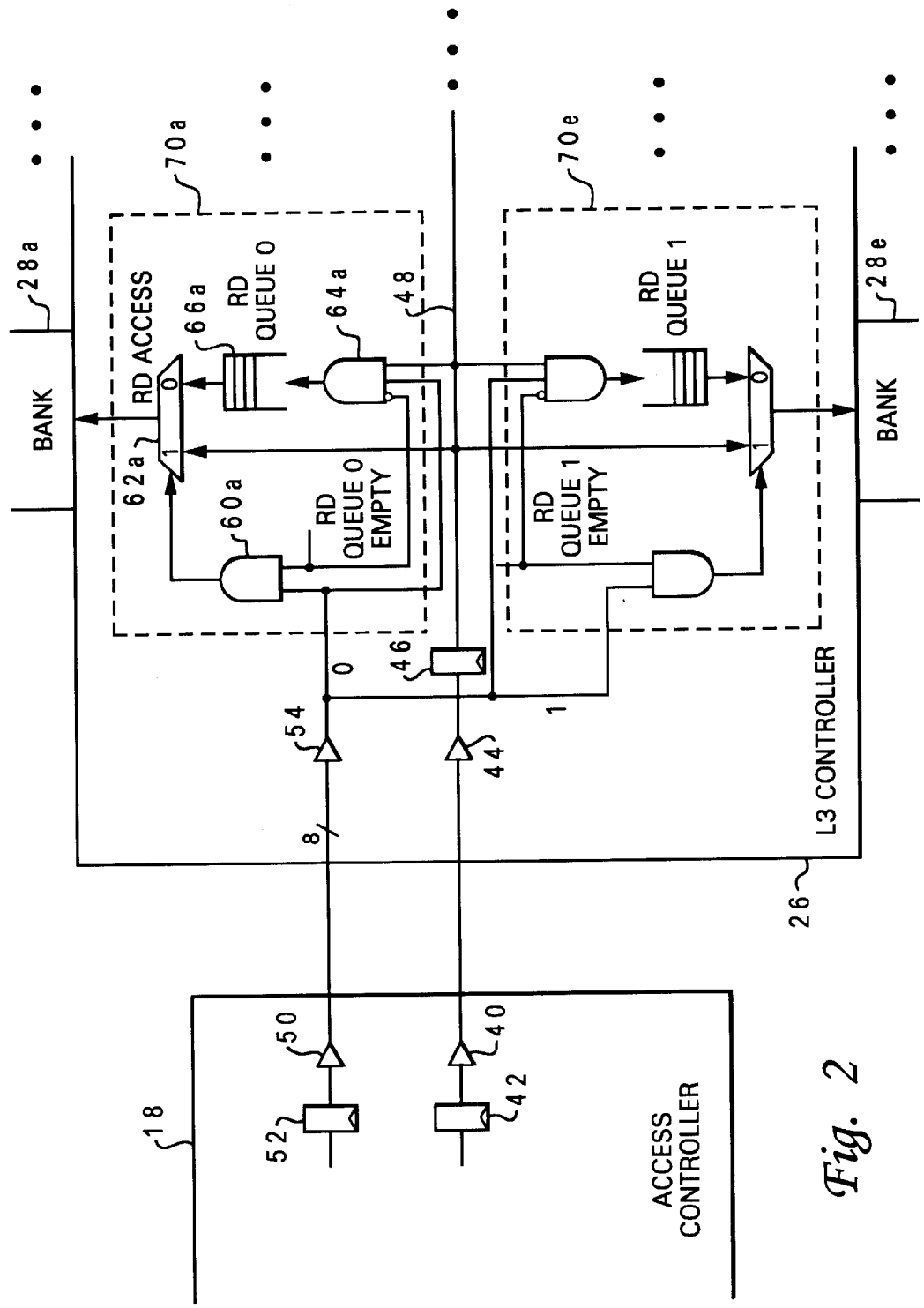
FIG. 2 illustrates a detailed block diagram of the processor and multi-level cache depicted in FIG. 1.

Referring now to FIG. 2, there is illustrated a detailed block diagram of the processor and multi-level cache depicted in FIG. 1. As previously described, when access controller 18 receives an address request, address controller 18 speculatively transmits the address request to L3 controller 26 of banked cache 24. In particular, a driver 40 drives the address request signal from a latch interface 42 within access controller 18 to a receiver 44 which drives the address request signal to latch interface 46 within L3 controller 26.

Inherently, transmitting the address request from latch interface 42 to latch interface 46 requires at least one clock cycle. Therefore, for example, at a first clock cycle an address request is latched in latch interface 42 and at a second clock cycle an address request is latched in latch interface 46. The address request in latch interface 46 is distributed to multiple control logic 70a–70h for each of banks 28a–28h over a fast path high-level metal interconnect 48 within L3 controller 26 during the second clock cycle. In particular, high-level metal interconnect 48 is a high-level interconnection within banked cache 24 and provides a low latency path by which the address request is distributed.

Figure 3:
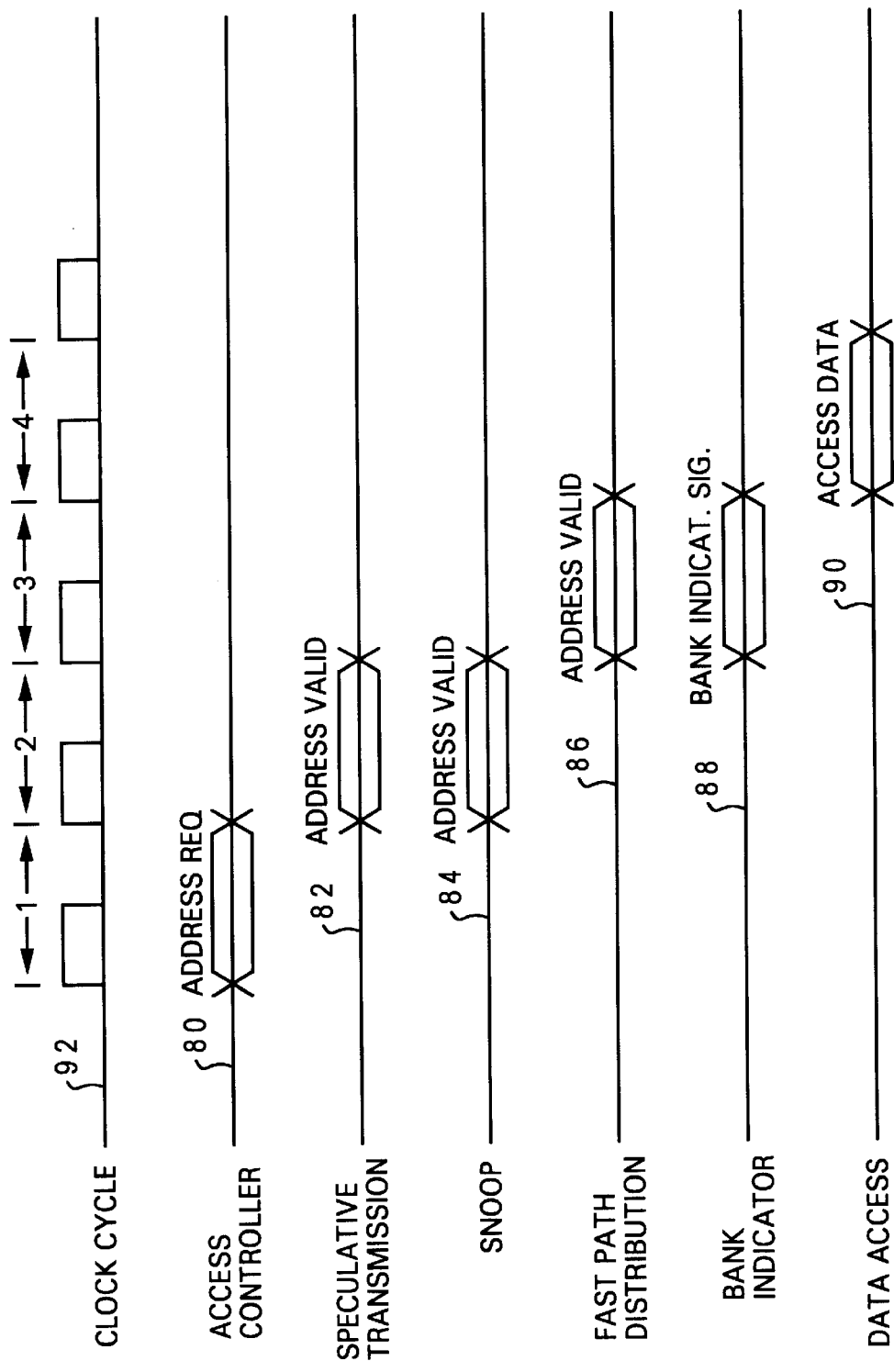
FIG. 3 depicts a timing diagram for accessing an address request in accordance with the present invention.

With reference now to FIG. 3, there is depicted a timing diagram for accessing an address request in accordance with the present invention. A clock cycle is depicted at reference numeral 92 for the timing diagram whereby clock cycles are determined. In the example, during a first clock cycle, an address request is received at access controller 18 as illustrated at reference numeral 80. During a second clock cycle, the address and data valid signal are speculatively transmitted, as depicted at reference numeral 82. Thereafter, during a third clock cycle, the address and data valid signal are distributed along metal interconnect fast path 48 to each of the banks, as depicted at reference numeral 86.

Referring again to FIG. 2, as previously described, during a first clock cycle, access controller 18 snoops the L3 directory with an address request. When access controller 18 receives a bank hit from snooping the L3 directory, bank indication data is sent to L3 controller 26, whereby the bank containing the address request may be accessed. In particular, a driver 50 drives the address request from a latch interface 52 within access controller 18 to a receiver 54 which drives the address request to control logic 70a–70h for each of banks 28a–28h during a second clock cycle. Thereby, both the address request signal and the bank indicator signal arrive at control logic 70a–70h for each of banks 28a–28h during a single clock cycle.

In particular, for eight banks, an 8-bit bank indicator signal is driven, 1-bit per bank, to each of banks 28a–28h. The 8-bit indicator signal specifies in which bank a hit may have occurred. Within each control logic 70a–70h a logic gate 60 ANDs the corresponding bit of the 8-bit bank indicator with a read queue empty signal. Each control logic 70a–70h includes a read queue 66, or other data structure for storing address requests which are waiting to be accessed. If read queue 66 is empty, then the read queue empty signal is high. Therefore a fast path read is indicated only when read queue 66 is empty.

With reference again to FIG. 3, during a second clock cycle, the address request is snooped in the caches, including the L3 directory, as depicted at reference numeral 84. During a third clock cycle, the snoop returns a bank indication signal that is sent to access controller 18, as illustrated at reference numeral 88. Thereby, the address request is available at each bank and the bank indicator signal determines which bank can access the address request. Preferably, during a fourth cycle, the indicated bank is accessed with the address request and data is read, as depicted at reference numeral 90.

Referring again to FIG. 2, L3 controller 26 utilizes control logic 70a–70h to control access to each of banks 28a–28h. A pass-gate multiplexer 62a selects between address requests for input to bank 28a as a read access. In particular, pass-gate multiplexer 62a selects an address request from high-level metal interconnect 48 when a control input is "1" and an address request from read queue 66a when a control input is "0". In the present embodiment, if the ANDing of the lowest bit of the bank indicator signal and the read queue empty signals is high, then a pass-gate multiplexer 62a receives a control input of "1". Alternatively, in the present embodiment, if the ANDing of the lowest bit of the bank indicator signal and the read queue empty signal is low, then pass-gate multiplexer 62a receives a control input of "0".

A logic gate 64a ANDs the inverse of the read queue empty signal, the lowest bit of the bank indicator signal and the address request signal from high-level metal interconnect 48. Thereby, when read queue 66a is not empty and the lowest bit of the bank indicator signal indicates a hit, the address request signal is transferred to read queue 66a. Thereby, each of the queued address request signals may be sent as a read access when the corresponding bank is available. In particular, because the power applied to DRAM caches must be refreshed periodically, each bank of banked cache 24 may not be available when an address request is received with a bank indicator indicating a hit in that bank. Therefore, read queue 66a queues address requests when a bank is not available due to power refresh.

As has been described, the present invention provides an improved method and system for high speed data access to a remote banked DRAM cache from a processor. However, in alternate embodiments of the present invention, other high speed access to other types of banked cache may be provided. In addition, in alternate embodiments, the banked cache may be on-chip with the processor core. Further, while one type of control logic is depicted for controlling access to each bank of the banked DRAM cache, in alternate embodiments, other types of control logic may be utilized, as will be apparent to one skilled in the art.

While the invention has been particularly shown and described with reference to a preferred embodiment, it will be understood by those skilled in the art that various changes in from and detail may be made therein without departing from the spirit and scope of the invention.

What is claimed is:

1. A method for high speed data access to a banked cache memory, said method comprising:
   during a first cycle, in response to receipt of a request address at an access controller:
      speculatively transmitting said request address to a banked cache memory, wherein
   said speculative transmission has at least one cycle of latency; and
      concurrently snooping said request address in a directory associated with said banked cache memory;
   thereafter, during a second cycle:
      distributing said speculatively transmitted request address to each of a plurality of banks of memory within said banked cache memory;
      in response to a bank hit from snooping said directory, providing said banked cache memory with a bank indication indicating which bank of memory among said plurality of banks of memory contains a storage location identified by said request address; and
      outputting data associated with said request address from said banked cache memory, in response to said bank indication, such that access time to a high latency remote banked cache memory is minimized.

2. The method for high speed access to a banked cache memory according to claim 1, wherein said step of speculatively transmitting said request address further comprises speculatively transmitting an n-bit request address and a valid address signal.

3. The method for high speed access to a banked cache memory according to claim 1, wherein said step of speculatively transmitting said request address further comprises:
   utilizing a driver to drive said request address from a first latch within said access controller to a receiver within said banked cache memory; and
   utilizing said receiver to drive said request address to a second latch within said banked cache memory.

4. The method for high speed access to a banked cache memory according to claim 1, wherein said step of speculatively transmitting said request address further comprises speculatively transmitting said request address to a banked DRAM cache.

5. The method for high speed access to a banked cache memory according to claim 1, wherein said step of speculatively transmitting said request address further comprises speculatively transmitting said request address to an off-chip banked embedded DRAM cache.

6. The method for high speed access to a banked cache memory according to claim 1, wherein said step of concurrently snooping said request address in a directory further comprises snooping a directory coupled to said access controller, wherein said directory contains an address array for said banked cache memory.

7. The method for high speed access to a banked cache memory according to claim 6, wherein said step of snooping a directory further comprises snooping a directory embedded within an integrated circuit.

8. The method for high speed access to a banked cache memory according to claim 1, wherein said step of distributing said speculatively transmitted request address further comprises placing said speculatively transmitted request address on a dedicated high-level circuit path which directs said request address to each of said plurality of banks of memory.

9. The method for high speed access to a banked cache memory according to claim 1, wherein said step of providing said banked cache with a bank indication further comprises:

driving said bank indication from said directory to a latch within said access controller; and driving said bank indication with a driver from said latch within said access controller to a receiver within said banked cache memory, wherein said receiver drives said bank indication to each of said plurality of banks of memory to indicate which bank of said plurality of banks of memory contains a storage location identified by said request address.

10. The method for high speed access to a banked cache memory according to claim 1, wherein said step of outputting data associated with said requested address from said banked cache memory further comprises:

accessing said bank of memory indicated by said bank indication with said request address only if a queue associated with said indicated bank of memory is empty; and storing said request address in said queue for access in a subsequent cycle, in response to providing a bank indication for a bank of memory which does not have an empty queue.

11. The method for high speed access to a banked cache memory according to claim 1, wherein said step of outputting data associated with said requested address from said banked cache memory further comprises accessing said bank of memory indicated by said bank indication with said request address only when said bank of memory is power refreshed.

12. A system, said system comprising:

a banked cache memory, wherein said banked cache memory [comprises] includes a plurality of memory banks;

a directory associated with said banked cache memory;

an access controller, wherein during a first cycle said access controller speculatively transmits any request received at said processor system to said banked cache memory while concurrently snooping said request in said directory, and wherein during a second cycle said access controller provides said banked cache memory with a bank indication indicating which memory bank among said plurality of memory banks contains a storage location identified by said request address; and a banked cache controller for controlling said banked cache memory, wherein during said second cycle said banked cache controller distributes said speculatively transmitted request address to each of a plurality of memory banks within said banked cache memory along a low latency path.

13. The system according to claim 12, said access controller further comprising:

control means for speculatively transmitting an n-bit request address and a valid address signal.

14. The system according to claim 12, said system further comprising:

a driver within said access controller to drive said request address from a first latch within said access controller to said banked cache controller; and a receiver coupled to said driver for driving said request address to a second latch and said low latency path within said banked cache controller.

15. The system according to claim 12, wherein said banked cache memory comprises a banked DRAM cache.

16. The system according to claim 12, wherein said system comprises a first integrated circuit containing said access controller and a processor core and a second integrated circuit containing said banked cache memory.

17. The system according to claim 12, wherein said directory further comprises an address array for said banked cache memory.

18. The system according to claim 17, wherein said system comprises an integrated circuit, separate from said banked cache memory, that includes a processor core and said directory.

19. The system according to claim 12, wherein said low latency path comprises a dedicated high-level circuit path which directs said request address to each of said plurality of banks of memory.

20. The system according to claim 12, wherein said banked cache controller further comprises:

first control means within said banked cache controller for permitting access to said bank of memory indicated by said bank indication with said request address only if a queue associated with said indicated bank is empty; and second control means within said banked cache controller for storing said request address in said queue for access in a subsequent cycle if said queue associated with said indicated bank of memory is not empty.

21. The system according to claim 12, wherein said banked cache controller further comprises:

control means for permitting access to said bank of memory indicated by said bank indication only when said bank of memory is power refreshed.

* * * * *

UNITED STATES PATENT AND TRADEMARK OFFICE
CERTIFICATE OF CORRECTION

PATENT NO.   : 6,553,463 B1
DATED        : April 22, 2003
INVENTOR(S)  : Arimilli et al.

It is certified that error appears in the above-identified patent and that said Letters Patent is hereby corrected as shown below:

Column 7,
Line 35, please delete "[comprises]" between "memory" and "includes".

Signed and Sealed this

Seventh Day of October, 2003

JAMES E. ROGAN
*Director of the United States Patent and Trademark Office*